(12) United States Patent
Petrisca

(10) Patent No.: US 11,345,612 B2
(45) Date of Patent: May 31, 2022

(54) SOLAR POWERED WATER DESALINATOR AND METHOD

(71) Applicant: Darian Petrisca, Oakville (CA)

(72) Inventor: Darian Petrisca, Oakville (CA)

( * ) Notice: Subject to any disclaimer, the term of this patent is extended or adjusted under 35 U.S.C. 154(b) by 0 days.

(21) Appl. No.: 16/926,019

(22) Filed: Jul. 10, 2020

(65) Prior Publication Data

US 2022/0009794 A1  Jan. 13, 2022

(51) Int. Cl.
*C02F 1/14* (2006.01)
*C02F 1/04* (2006.01)
*F24S 50/20* (2018.01)
*G02B 3/08* (2006.01)
*C02F 103/08* (2006.01)

(52) U.S. Cl.
CPC ............... *C02F 1/14* (2013.01); *C02F 1/042* (2013.01); *C02F 1/043* (2013.01); *F24S 50/20* (2018.05); *C02F 2103/08* (2013.01); *G02B 3/08* (2013.01)

(58) Field of Classification Search
CPC .... C02F 1/042; C02F 1/12; C02F 1/14; F24S 50/20; B01D 1/0029; B01D 1/0035; B01D 1/16; B01D 5/006; B01D 5/0066
See application file for complete search history.

(56) References Cited

U.S. PATENT DOCUMENTS 687,262 A * 11/1901 Powers ................. C02F 1/14
202/192
3,300,393 A  1/1967 Fisher
4,077,849 A  3/1978 Ziehm
4,323,052 A  4/1982 Stark
(Continued)

FOREIGN PATENT DOCUMENTS

CN  105347412 A  2/2016
KR  10-1848683  4/2018

OTHER PUBLICATIONS

"Scale", Feb. 9, 2016 (date obtained by wayback machine), hydroflow-usa.com, URL: https://www.hydroflow-usa.com/Scale (Year: 2016).*
"12 Creative Ways to Reuse Shipping Containers", GlobalTraz.com, May 25, 2016, https://www.globaltranz.com/shipping-container/ (Year: 2016).*
(Continued)

*Primary Examiner* — Jonathan Luke Pilcher

(57) ABSTRACT

A water desalinator that employs the use of solar concentration, evaporation and humidification, mimicking the natural hydrological cycle in a closed, modular vessel to produce freshwater from salt, brackish, brines and seawater, and a concentrate stream for further processing. Feed water is received and stored in a basin. Surface humidity is generated by the evaporation of basin water. A lens is used to focus sunlight, tracked the suns path based on biomimicry of a sunflower, on a thermal conductor. The thermal conductor has a rounded side-profile and generates a variable temperature across its radius. Water is pumped from the basin to a sprinkler head to be dripped or sprayed on the thermal conductor to generate water vapour. This water vapour consequently mixes with the air in the reaction vessel to increase system humidity. Humid air is removed from the reaction vessel and condensed in a condenser. Accordingly, the salinity concentration of input water is reduced from the output of the reaction vessel. Multiple reaction vessels or concentrators may be used in tandem to achieve improved performance.

17 Claims, 7 Drawing Sheets

(56) References Cited

U.S. PATENT DOCUMENTS

| | | | | |
|---|---|---|---|---|
| 4,660,544 | A | * | 4/1987 | Husson, Jr. ............... C02F 1/14 126/674 |
| 4,966,655 | A | | 10/1990 | Wilkerson, Jr. |
| 5,348,622 | A | * | 9/1994 | Deutsch ................... B01D 3/42 202/176 |
| 5,650,050 | A | | 7/1997 | Kaufmann |
| 6,500,216 | B1 | * | 12/2002 | Takayasu ............. B01D 5/0084 23/303 |
| 8,882,968 | B1 | * | 11/2014 | Griggs ................ B01D 1/0082 203/10 |
| 2009/0020406 | A1 | * | 1/2009 | Nirmalakhandan .... C02F 1/046 202/154 |
| 2009/0152183 | A1 | * | 6/2009 | Stewart ................... B63J 4/004 210/181 |
| 2014/0231327 | A1 | * | 8/2014 | D'Alba ............... B01D 5/0066 210/175 |
| 2015/0298991 | A1 | | 10/2015 | Salama |
| 2015/0353379 | A1 | | 12/2015 | Lee |

OTHER PUBLICATIONS

Wu et al., "Experimental investigation of a multi-stage humidification-dehumidification desalination system heated directly by a cylindrical Fresnel lens solar concentrator", Energy Conversion and Management 143 (2017), pp. 241-251.

Mahmoud et al., "Utilization of Fresnel Lens Solar Collector in Water Heating for Desalination by Humidification-Dehumidification Process", Fifteenth International Water Technology Conference, IWTC-15 2011, Alexandria, Egypt.

Sarah Wray, "Saudi Neom megacity plans world-first 'solar dome' desalination plant" URL: https://www.smartcitiesworld.net/news/news/saudi-neom-megacity-plans-world-first-solar-dome-desalination-plant-4992, Jan. 31, 2020.

"Solar still smashes desalination record" URL:https://www.theengineer.co.uk/solar-still-smashes-desalination-record/, Feb. 10, 2020.

Machine generated English translation of KR 10-1848683, Patent Translate EPO, retreived Oct. 8, 2020.

International Search Report and Written Opinion dated Oct. 5, 2021, issued in international patent application No. PCT/CA2021/050948 (13 pages).

* cited by examiner

SOLAR POWERED WATER DESALINATOR AND METHOD

FIELD

This disclosure relates to desalination using solar concentration, evaporation and humidification.

BACKGROUND

The vast majority of water on earth is salt water. As access to fresh water supplies (for drinking, irrigation & industrial purposes) continues to be a global concern, the ability to generate potable water from previously untapped or undertapped sources will be a key factor in ensuring the habitability of any given location. Accordingly, there exists a desire to remove salt and minerals from brackish water or seawater to be used for human consumption, agriculture or alternative industrial uses. Water related issues are only intensified in areas of increased water scarcity, electricity availability and the impeding effects of climate change.

Water vapour (found in mist, fog, clouds, etc) is the gaseous state of water. While the air we breathe is largely nitrogen and oxygen, air also includes water vapour. Humidity is the measure of the amount of water vapor in a body of air. Both temperature and pressure play a role in the amount of water vapour a body of air may hold. With constant pressure, the greater the temperature, the greater amount of water vapour a body of air can hold. Saturation refers to the maximum amount of water vapor an air mixture can contain at a given temperature. Steam is the term used to refer to pure water vapour, i.e. what is generated by bringing a body of water to 100° C. When a volume of air at a given temperature holds the maximum amount of water vapour, the air is said to be saturated. Relative humidity is the water-vapour content of the air relative to its content at saturation. If a body of air is saturated at a high temperature, a reduction of temperature will lower the amount of water vapour the body of air is able to hold. The excess water vapour will form a condensate (i.e. return to liquid form), free of dissolved salts and minerals.

Solar evaporation and concentration refers to the process of using solar energy from the sun to remove salt & mineral content from salty brines, brackish water or seawater. Through this process, an output water is generated having a lower saline concentration than an input water. Utilization of solar power to drive an evaporation process produces two streams: an evaporate and a concentrated, brine solution. This process occurs naturally through the water cycle: surface seawater is evaporated from heat generated by sunlight, humid air (i.e. air mixed with water vapour) then rises and turns into clouds, and the clouds condense and eventually turn into rainfall.

Known methods of desalination may use chemical, electrical or physical processes to treat input water. However, these methods can require a great deal of input energy or upfront costs to generate outputs of desalinated water. Further, the apparatuses themselves may occupy a great deal of physical space to fit the necessary complex, expendable apparatus and components. These systems also require a significant amount of process chemicals and energy for operation, and may create toxic by-products. These systems may also only function properly in specific locations.

Accordingly, there exists a need for a novel system, which is modular and can be deployed anywhere (in land, on floating platforms in seas and oceans), with minimal infrastructure/installation, labour with an extended lifecycle.

SUMMARY

An example water desalinator is divided into two modular components: a reaction vessel and a condenser. The reaction vessel receives a salt water input from an input source, and direct sunlight from a light source (such as the sun). The input water is stored in a basin. Solar rays are focused by a lens on a thermal conductor. Surface humidity is generated from the evaporation of basin water. In addition, water is pumped from the basin to the thermal conductor, wherein the water is instantly evaporated into water vapour, while water that isn't evaporated on the surface of the conductor is allowed to fall back to the basin. This water vapour mixes with the air in the reaction vessel to ensure maximum relative humidity. Any condensation that is formed within the reaction vessel will be removed through multiple drainage ports. The humid air is outputted/extracted from the reaction vessel to the condenser.

The condenser receives the humid air from the reaction vessel. Through a heat exchanger, the humid air is condensed to generate output water having a lower salinity than the input water. The heat exchanger employs a coolant (or cooler feedwater) to remove heat from the humid air, thereby lowering the saturation point, and generating condensate.

Aspects of the present disclosure relate to a water desalinator comprising: a reaction vessel, the reaction vessel comprising: a basin, configured to receive salty water, the basin having an open surface to allow water to evaporate from the basin and rise to the top of the reaction vessel; a pump configured to provide the salty water to a thermal conductor, wherein the thermal conductor is positioned at a height above the basin and heated using a lens to generate water vapor from the salty water provided to the thermal conductor; drainage panels extending from at least one wall of the reaction vessel to an opening, wherein the drainage panels are configured to allow evaporated water from the basin to pass and drain any condensation formed above the drainage panels; and an output vent configured to remove humid air from the reaction vessel; a condenser, the condenser comprising: a heat exchanger configured to receive humid air from the output vent, wherein the heat exchanger is cooled with a coolant to condense water vapour in the air to generate water having a lower salinity and mineral content.

Other aspects relate to a method of solar concentration, evaporation and humidification, the method comprising: receiving salty water from an input source; storing the salty water in a reaction vessel having a basin; evaporating at least a portion of the salty water from the surface of the basin to rise to the top of the reaction vessel; pumping the salty water from the basin to a thermal conductor to be vapourized, wherein said thermal conductor is: heated using a lens, and said thermal conductor has a variable temperature across radial distances from its center; outputting the air from the top of the reaction vessel to a condenser; and condensing the air in a condenser into a distillate form.

Other aspects relate to a desalinator comprising: an intermodal shipping container, the shipping container comprising: a lower portion forming a basin configured to store salty water, an upper portion, the upper portion comprising a lens and thermal conductor configured to receive salty water pumped from the basin to generate humid air, and drainage panels positioned between the lower portion and upper portion, the drainage panels configured to capture and remove any condensate formed in the shipping container, wherein the humid air is output to a condenser for condensation of water vapor, generating a lower pressure in the intermodal shipping container.

BRIEF DESCRIPTION OF DRAWINGS

Embodiments will be described, by way of example only, with reference to the accompanying figures in which.

DETAILED DESCRIPTION

Figure 1:
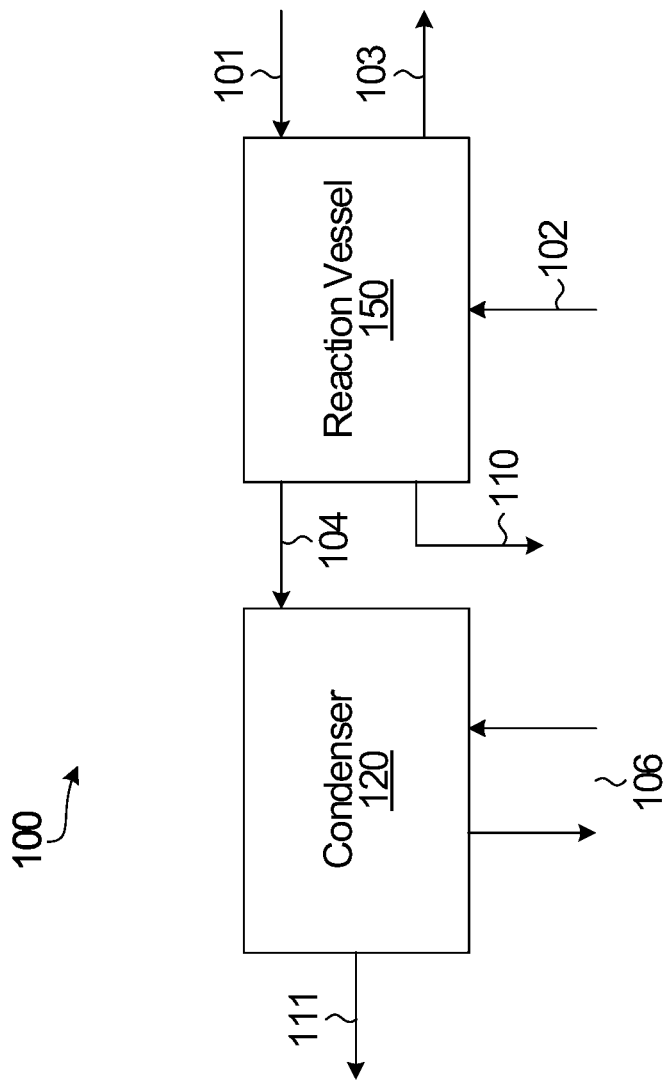
FIG. 1 is a block diagram of a water desalinator, according to one embodiment.

FIG. 1 is a block diagram of a water desalinator 100 to be used for solar concentration, evaporation and humidification, according to one embodiment. Water desalinator 100 includes a reaction vessel 150 and a condenser 120. A light source, such as the sun (not shown) emits rays of light into reaction vessel 150. Reaction vessel 150 receives, as an input, ambient air 101 and input water 102, and produces humid air 104. As a by-product, hot brine water 103 may be also output. Reaction vessel 150 may also generate some output water 110.

Humid air 104 is generally free of salt, and provided from reaction vessel 150 to condenser 120, where humid air 104 is condensed using condenser coolant 106 to generate condenser output water 111.

Figure 2:
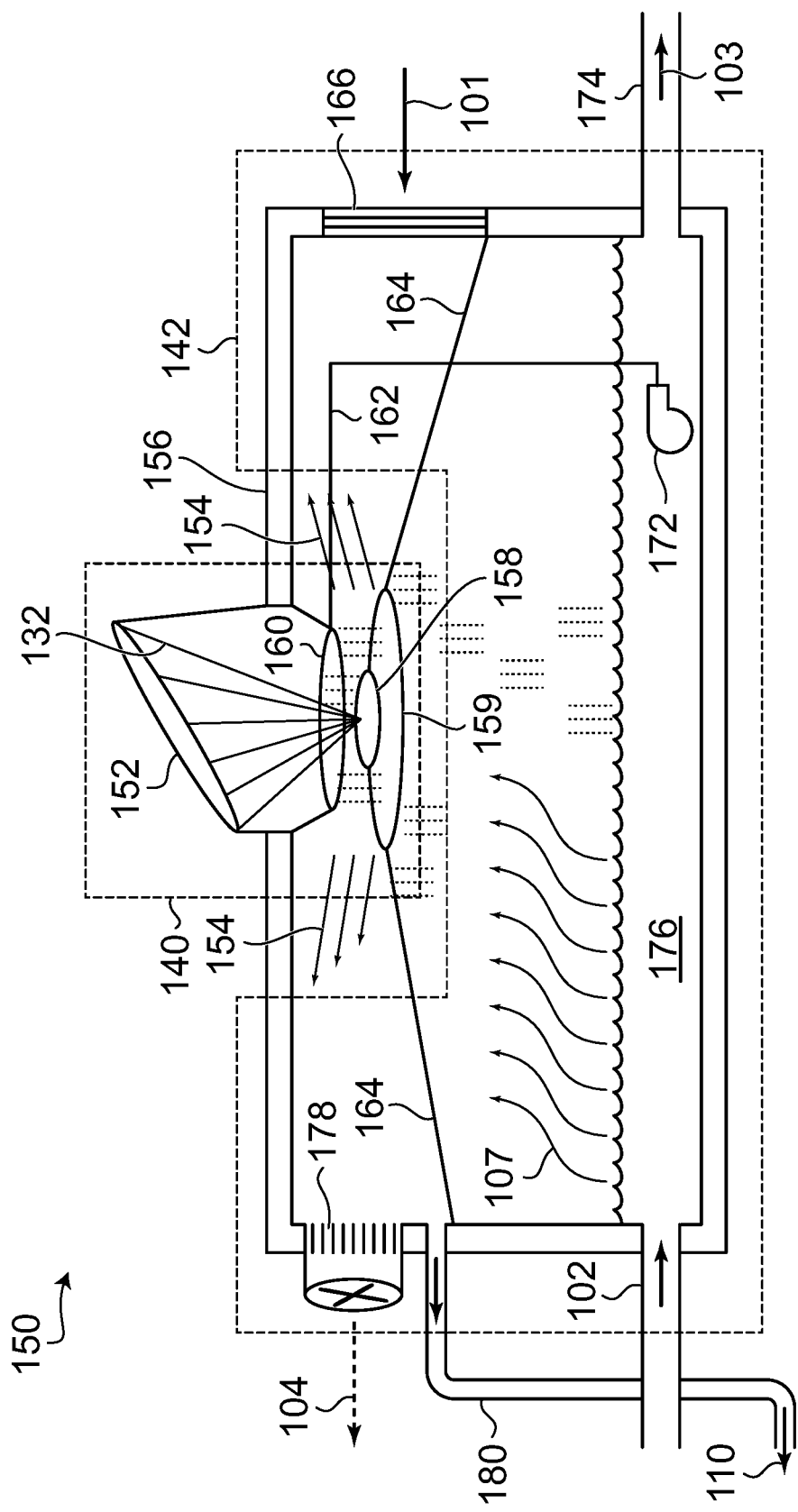
FIG. 2 is a schematic diagram of a modular reaction vessel to be used in the water desalinator of FIG. 1.

FIG. 2 illustrates the individual components of reaction vessel 150 of water desalinator 100. These components can be grouped into rapid water vapor components 140 and surface evaporation components 142. Both rapid water vapor components 140 and surface evaporation components 142 are housed in a container vessel 156. Rapid water vapor components 140 include lens 152, solar tracker 154, thermal conductor 158, and sprinkler head 160. Rapid water vapor components 140 are situated proximate to the top of reaction vessel 150 in relation to the focal point of lens 152. In the depicted embodiment, they are centrally located, but can be installed in any location that allows maximum solar concentration into the reaction vessel 150. Surface evaporation components 142 are located below the rapid water vapor components 140, and include a basin 176, a water recirculation pump 172, an intake vent 166, an exhaust fan 178, drainage panels 164, and brine output 174.

The external structure of reaction vessel 150 may be realized by a modular container vessel 156. According to some embodiments, container vessel 156 is a standard intermodal freight container retrofitted for the purposes of this desalination process. Container vessel may be generally rectangular, having six faces each made of steel. In an example embodiment, an intermodal freight container may be used (or re-used). This pre-existing, modular shape can provide a low cost, robust option that can be deployed and shipped globally as standard practice. Container vessel 156 may have large and re-sealable double-sided doors on one or both ends of the container vessel 156 for access to internal components for routine maintenance. The external steel walls may be lined or coated with insulation and a thermoplastic layer (PVC, CPVC, etc.) suitable for heat and high saline water corrosiveness. In alternate embodiments, greenhouse type structures (not shown), or variant shapes such as circular domes could be used. In larger installations, plants may be added to interior of reaction vessel 150, allowing container vessel 156 to have dual functionality of a conventional greenhouse, in addition to being a reaction vessel 150. In these embodiments, greenhouse plants add additional moisture to the water desalinator 100 via transpiration.

Container vessel 156 can be converted from standard intermodal freight containers of varying length (10', 20', 40', 53', etc.). An intermodal freight container allows ease of transport and retrofit of existing materials. Walls of container vessel 156 are insulated to produce high content of water vapour and condensation. The walls of the reaction vessel 150 may be opaque, not allowing sunlight to enter, only through the lens 152. Therefore, water desalinator 100 can capture and maintain the heat as production time elapses. Alternatively, container vessel 156 may be configured to use transparent walls, much like a greenhouse.

Container vessel 156 may further include components to combat the effects of corrosion and scale from the minerals in input water 102. As a metal surface will start to accumulate with scale formation and salt deposits from the evaporated water, liner plates may be installed within container vessel 156 in a manner that will allow them to be removed, accessed, cleaned in place, or scraped as needed. According to other embodiments, in an effort to reduce scale formation and buildup, a low DC current may be applied to the electrically conductive components to counter-act the formation of scale.

Reaction vessel 150 receives as an input water 102 via input pump (not shown). Input water 102 is salty—and can be salt water, brackish water, industrial brine or sea water. Input water 102 can also be designed for other streams—mine water concentration, metals, brines, product recovery, contaminated or toxic effluents, etc. The feed flow rate of input water 102 through input pump (not shown) may be calculated dependent on the rate of evaporation realized in the reaction vessel 150. Input water 102 may further act as a quenching solution for the condensate. Alternatively, input water 102 can be introduced to reaction vessel 150 using gravity from a larger holding tank (acting as a miniature water tower)—not shown. Input water 102 will typically be warm and saline. Depending on the source water, there may also be foaming that occurs in reaction vessel 150. Conductivity, temperature, alkalinity, pH are some of the parameters of input water 102 that can be monitored using sensors in reaction vessel 150 communicating with a controller (not shown) for process performance.

Input water 102 may be stored in a basin 176 formed from the bottom of container vessel 156. Basin 176 may take the form of a tub, or may simply be formed as the bottom of container vessel 156. Other types of basins will be apparent to those of ordinary skill. The top surface of basin 176 is exposed, allowing water vapour to rise from basin 176 within container vessel 156. As the internal temperature of container vessel 156 increases (and eventually reaches steady state), water will evaporate from the exposed surface of the water in basin 176, and rise as surface humidity 107. The depth of the water in basin 176 may be suited for humid air generation, to allow significant wall surface exposure to increase surface evaporation in the vessel. Basin 176 will also be monitored for water quality (TDS, conductivity, temperature, etc.) through sensors communicable with a controller (not shown). Based on these sensor inputs, the basin water may be cycled through the basin and the water volume may be increased by allowing more water in, or decreased by letting water out, or cycled by doing both. A heater (not shown) may be installed in basin 176 to warm the water, increasing surface water evaporation during periods of low solar activity, such as during evenings and nighttime.

Water (in liquid form) in basin 176 is pumped from basin 176 to rapid water vapor components 140 using recirculation pump 172. Recirculation pump 172 may, for example, be a low voltage, low flow and pressure (submersible) pump that may continuously recirculate water from the bottom of the container basin 176, up through the sprinkler head 160. The pressure of recirculation pump 172 may be adjusted through manual valves on each nozzle, or operate under automatic control based on controller input, having sensor information about the temperature of thermal conductor 158. For example, recirculation pump 172 may be adjusted to have a higher flow rate for a higher reaction vessel 172 operating temperature, and lower flow rate for lower operating temperature. Output of recirculation pump 172 is the water sprayed on thermal conductor 158.

Output of recirculation pump 172 is provided to sprinkler head 160. Sprinkler head 160 may be a series of nozzles or perforations that direct water pumped from basin 176 on to thermal conductor 158 for evaporation thereon. The location, direction, position, and angle of the water from sprinkler head 160 can be adjusted manually or automatically using electromechanical components controlled by controller (not shown). Sprinkler head 160 may be configured to spray water at a position off-centre of the center of thermal conductor 158. Water may be sprayed on thermal conductor 158 at a constant rate to limit deformation of the thermal conductor 158, but to maintain a temperature at a specific position on thermal conductor 158 (i.e. water is sprayed on to the surface at a rate to keep the thermal conductor 158 at a constant temperature under steady state conditions). Alternatively, valves may open on a timer at a fixed or variable rate, allowing the water will flash on and off the thermal conductor 158. This allows thermal conductor 158 to heat and cool down, then the process may continue in a batch mode. Specific rates may be modified based on environmental variables such as weather. For example, on a particularly sunny day, the concentrator may pump maximum water pressure for a maximum time. On a cold and dark day, water may be pumped far less frequently to maintain the limited heat on the thermal conductor 158. Pump 172 may be a compact and submersible pump that is heat and corrosion resistant. Sprinkler head 160 may act as a throttling valve to reduce pressure in the passing liquid, encouraging flash evaporation in reaction vessel 150.

The water sprayed from sprinkler head 160 will be evaporated off thermal conductor 158 and form water vapour. This water vapour will mix with the air in container vessel 156 to generate the humid air (i.e. with a high relative percentage of water vapor in air), in addition to the rapid flash of steam that would immediately condense. Relative humidity in container vessel 156 may be kept between 40% and 100%, controlled by the controller (not shown) by modifying operational parameters of the water desalinator 100. If any water is not evaporated immediately off thermal conductor 158, it will remain in liquid form and fall back down through opening 159 to basin 176 below, to be recirculated once again. Water pumped on to thermal conductor 158 will further operate to mitigate any potential heat deformation that may occur due to the concentrated solar energy.

As input water 102 contains salt and other minerals, some solid minerals may be deposited on thermal conductor 158 as input water 102 evaporates. A salt removal wash sequence may be applied, whereby fresh water or brine in the bottom of the insulated vessel could be allowed to be sprayed continuously, when the unit in not producing steam/water vapour, thereby removing/dissolving the scale build up in off production hours (i.e. at nighttime), rendering this a self-cleaning process. Alternatively, thermal conductor 158 could be physically removed periodically and placed in a solution that will dissolve any scale build up.

Thermal conductor 158, according to some embodiments, may be a metal, metalloid form, alloy or coated plate with a thermal conductivity, melting point and thermal transmissivity suitable to allow for even, quick distribution of heat, without warping or melting at temperatures greater than 500° C. Further, thermal conductor 158 may be coated or treated to prevent or minimize corrosion. Thermal conductor 158 may be made of multiple metals. Thermal conductor 158 may be affixed to the reaction vessel itself using a mounting bracket or other attachment means, or may be connected to the drainage panels 164 (which may themselves connected to the side walls of container vessel 156). The solar thermal energy is received in the center of thermal conductor 158, and radiates downward and outward through thermal conductor 158, generating a variable temperature based on radial distance from the thermal conductor's core. Thermal conductor 158 may include temperature sensors operable to communicate temperatures on the thermal conductor 158 at different positions, which can in turn provide feedback for solar tracking optimization.

The relative humidity close to the surface of the thermal conduction 158 will be the lowest in the reaction vessel 150, as there is significant latent heat produced by the thermal conductor 157 during operation. Relative humidity will increase at greater radial distances from the center for the thermal conductor 158 disc as water vapour is produced and evaporated. Thermal conductor 158 may have flared edges or grooves to reduce water droplet scattering due to the Leidenfrost effect (wherein a liquid close to a significantly hotter liquid produces an insulating vapor layer to keep the liquid from boiling rapidly). Because of this repulsive force, a droplet hovers over the surface rather than making physical contact with the hot surface. If water does fall off of thermal conductor 158, the water will fall through opening 159 and will splash into basin 176. The splashes generated by falling water will generate greater surface area in basin 176, thereby increasing the surface evaporate 107.

Thermal conductor 158 is heated by rays of light 132 focused by lens 152. The solar energy from rays of light 132 can concentrate as solar thermal energy. The thickness, size and material (glass, water, plastic, epoxy, etc) of lens 152 will depend on the enclosure volume. According to some embodiments, lens 152 is one of a magnifying glass, Fresnel lens, and water lens. Dependent on the type of lens 152, individual optic components may be modified to optimize the lens 152 for the intended purpose of desalination. For example, the geometric properties of the lens 152 may be modified. In cases where the lens 152 is a Fresnel lens, the shape and configuration of any successive concentric rings or steps of the lens may be defined or configured. The amount of energy that can be concentrated on the surface of the thermal conductor 158 would be in the range of 500 kW/m², with temperatures ranging up to from 700° C.-900° C. Thermal conductor 158, therefore acts as an internal heater in the container vessel 156, further creating opportunities for evaporation.

Lens 152 is connected to and may be repositioned by solar tracker 154. Solar tracker (or heliostat) 154 is a movable apparatus configured to swivel, turn and rotate the lens 152. The solar tracker 154 will mimic the sun tracking much like a sunflower rotates and follows the sun throughout the day (and then repositions itself to start again in the morning). Solar tracker 154 is attached to container vessel 156 and will reposition lens 152 to optimize the water desalinator 100 to generate the maximum amount to output water 111 as programmed by a controller (not shown). The height of lens 152 can also be adjusted by solar tracker 154 to accommodate different configurations or types of lenses 152 (for example, one using a different type of lens). Solar tracker 154 is also configured to isolate the container vessel 156 to capture moisture, humid air and steam. Solar tracker 154 contains the area between lens 152 and container vessel 156 using a flexible sheet of insulating, air tight material that will prevent the steam and water vapour from escaping into the external atmosphere. The insulating material is flexible enough such that it will not impede the movements of lens 152 controlled by solar tracker 154 to track the suns position across the sky. Insulating material also acts as a vapour barrier to keep the humid air in the container. Any condensation that is generated on insulating material can be routed to a trough (not shown) and then collected. For maintenance purposes, the insulating material can be easily removed to allow an operator access to the top portion of the container, the thermal conductor, nozzles, etc.

Solar tracker 154 may be formed using servomotors or any other adjustable mechanical or electromechanical system that may reposition the lens 152 along a transverse or rotational axis. Solar tracker 154 may for example adjust the anchor points of the lens 152 in three dimensions. Solar tracker 154 is designed to withhold the weight of the lens and is stable enough to remain fixed, damping any vibration from operation or any undue weather. Solar tracker 154 may include a robotic arm to control the distance from thermal conductor 158 to the focal point of lens 152.

Some water may condense within reaction vessel 150 before being output through output vent 178. In order to capture as much condensate droplets 110 as possible, drainage panel or impervious coverings 164 are to be attached to container vessel 156. Any condensate droplets 110 that form above drainage panels 164 travel down along drainage panels 164 and out condensate output pipes 180. A controllable valve may be placed before output pipes 180 to optionally determine whether to allow for condensate to flow through. Drainage panels 164 may be formed from a galvanized metal, stainless steel or similarly suitable material for use in high temperature, high saline, and high humidity environments. Drainage panels 164 extend from the walls of container vessel 156 to a position below the surface evaporation components 142. According to some embodiments, drainage panels 164 extend from all walls of the container vessel 156. According to other embodiments, drainage panels 164 only extend from some walls of container vessel 156. Drainage panels 164 may take the form of a truncated hollow cone or truncated pyramid, with top position having a rounded or squared opening 159. Opening 159 can be realized outside of the projected circumference of thermal conductor 158. Condensate will thus not fall back into the basin 176 below, but will flow down the side of the drainage panel and enter a collection piping system to output as output water 110. Drainage panels 164 may alternatively form a convex or concave loop to capture and isolate the moisture once it has condensed while still preventing the moisture from returning into basin 176. Optionally, a purge valve (such as a solenoid valve) may be connected to the drainage panel 164 runoff system.

The purge valve may be controlled by controller (not shown) to open at a predetermined time or rate to avoid heat loss and vacuum loss in the container. Any condensate that may form below drainage panels 164 may fall down into basin 176. According to some embodiments, there are be multiple drainage ports to allow the collected condensate to trickle and drip into a common header to be sent to a fresh water storage tank.

As input water 102 in basin 176 evaporates, the saline concentration and temperature of water in basin 176 will increase (when the reactor is in operation). Therefore, there is a need to remove water in basin 176. Reaction vessel 150 outputs warmer hot brine water 103 through brine water output pump (not shown) or via gravity drainage and a hand or solenoid valve This warmer water will be removed as hot brine water 103 and replenished with additional input water 102. The extraction process, according to some embodiments, can be based on a depth level in the collection basin (i.e a valve may be opened until a lower level is reached, then fresh feed will be added). According to other embodiments, extraction of hot brine water 103 is based on sensed measurements of temperature, total dissolved solids (TDS), conductivity, etc. The optimal concentration and temperature of the brine solution will depend on a number of factors, such as the scaling formation issues in the reaction vessel 150, optimum evaporation rates, etc. Hot brine water 103 can be further evaporated in another downstream reaction vessel 150 (multiple reaction vessels 150 can be arranged in series to generate a solid, making this a fully zero liquid discharge process), discharged back into an input pool, or used in an alternative industrial purpose as a higher salinity brine.

Container vessel 156 may allow ambient air 101 to enter through ambient air intake 166. To allow for evaporation to occur, as well as condensation in reaction vessel 150, cooler external air can be introduced with the addition of vents or fans. Ambient air intake 166, may be controlled manually or electromechanically using servomotors or a controller. Additional air intake vents 166 may be positioned throughout container vessel 156. Ambient air intake 166 can be throttled open to closed. This allows ambient air 101 that is cooler and dryer to enter the container. Ambient air intake 166 may be configured to modify its input allowance in order to sustain a relative humidity setpoint within container vessel 156. Alternatively, the ambient air intake 166 may be configured to sustain a specific air temperature in the upper level of the container.

Incoming air velocity will be dependent on the size of the vent opening as well as the size of the extraction fan. The extraction fan(s) will be rated anywhere from 300 standard cubic feet per minute (scfm) to 10,000 scfm (or greater depending on the size and number of container vessel 156 employed). When a pressure lower than atmospheric pressure is achieved in the reaction vessel, the ambient air intake 166 can be programmed to open at 10% (0-100% open) intervals, which will be controlled via the relative humidity, and temperature in the reaction vessel. The anticipated airspeed of extraction air (humid/moist), arising from a combination of the extraction fan and ambient air intake will be in the range of 2-30 m/s. The goal of the air extraction is to remove as much water vapor from the reaction vessel 150, and not have any desalted water return to the basin 176 as condensate drips. In order to consistently maintain a constant relative humidity of 100%, the dew point temperature and dry bulb temperature should be close to 37.8° C.

The two types of humid air generated in the reaction vessel (namely humid air 107 as generated from surface of basin 176, and humid air 162 from thermal conductor 158) may be output to condenser through air exhaust fan 178. Air exhaust fan 178 provides air movement within the vessel, enhancing condensate of water droplets. If air exhaust fan 178 continues to output humid air 107 while ambient air intake 166 is closed, the pressure of internal container vessel 156 will decrease. With a lower internal container vessel 156 pressure, the rate of the surface evaporation of water in basin 176 will be increased. This vacuum will be produced because the reaction vessel 156 is an air tight enclosure, with the exception of the air intake port, 166 which will not be open all the time, and the extraction fan 178, which will create the vacuum effect in the vessel. An increase in airflow rate and velocity of air over the surface of the water air interface will also increase rates of evaporation. Reaction vessel 150, which has a goal to achieve a constant relative humidity of 100%, will therefore be foreseen to remove saturated air at a higher rate. Additional exhaust fans may be added to the top, middle and bottoms of reaction vessel 150. The performance of air exhaust fan 178 may be controlled with ambient air intake 166 to avoid condensation from occurring inside the reaction vessel 150, as opposed to the external air condenser. Communication and feedback between the air exhaust fan 178 and ambient air intake 166 will also provide the opportunity to create a slight vacuum in the container vessel 156. Having a vacuum in reactor 156 will cause the pressure in the container vessel 156 to be reduced, allowing the liquid to evaporate at a lower temperature (and thereby faster) than what would be experienced under normal barometric conditions. As the reaction vessel 150 will be operated as air tight, the extraction fan will continue to remove moist/humid air, while the pressure in the container can achieve 5-10 inches of $H_2O$ of negative pressure (from a water manometer).

Figure 3:
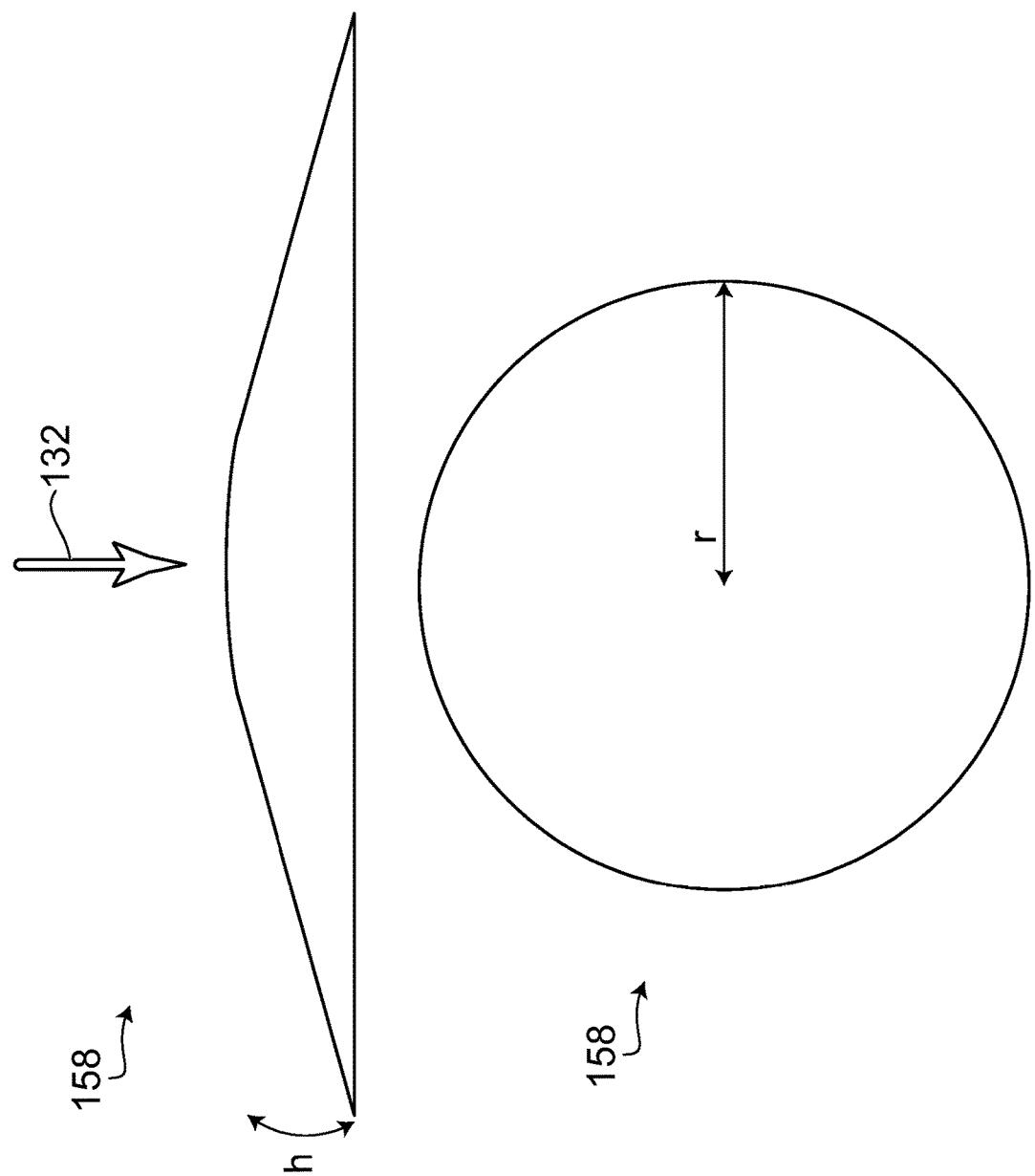
FIG. 3 is a schematic diagram of a thermal conductor to be used in a reaction vessel of the reaction vessel of FIG. 2.

FIG. 3 illustrates side and top views of thermal conductor 158, isolated from remaining components of container vessel 156. Thermal conductor 158 has a height h and radius r. The side profile of thermal conductor 158 further illustrates the shape in which the thermal conductor may take. As can be seen, thermal conductor 158 is largely curved on its top edge, however at a particular radial distance from the centre will begin to form a linear tangential. Thermal conductor 158 may be formed of a solid material. Alternatively, thermal conductor 158 may form a shell. If thermal conductor 158 forms a shell, the shell may have constant or variable thickness at varying radial distances from the centre of thermal conductor 158. While the side profile shape in FIG. 3 is illustrated, other side profiles, shapes and configurations may be employed. For example, rather than a curved top on thermal conductor 158, a cone having a less steep gradient may be employed. Alternatively, thermal conductor 158 may be entirely rounded, oblong, ovaloid, square, rectangle, triangular, octagonal, etc.

Based on the shape and material thermal conductivity of thermal conductor 158, a temperature gradient will be realized as the radial distance extends from the core (i.e. the centre of the thermal conductor 158) towards the radius r. The nature of this temperature gradient will be based on the material and geometric properties of the thermal conductor; however, the hottest point will be at the core, and the coolest point will be at the edges (i.e. radius r). For example, thermal conductor 158 may be composed of multiple sections, with each section made of a different metal or metal alloy. Accordingly, sprinkler head 160 (see FIG. 2) may be controlled using sensor data from thermal conductor 158 to determine the appropriate position having a radial distance to spray water to maximize humid air output. By spraying the radially outward areas of the core, evaporation will occur while preventing the thermal conductor from melting or warping.

Figure 4:
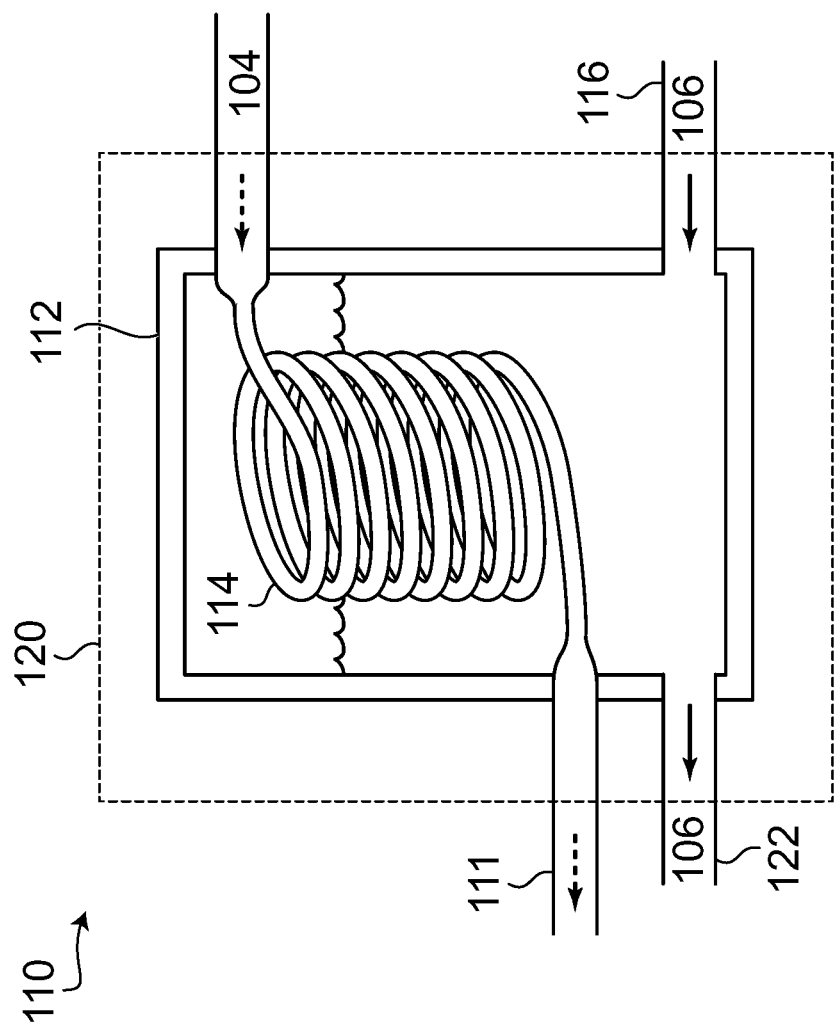
FIG. 4 is a schematic diagram of a condenser to be used in the water desalinator of FIG. 1.

FIG. 4 illustrates condenser 120, along with its internal components. Heat Exchanger 114 is positioned where most of the humid, moist air from the reaction vessel will be allowed to cool and condense. Condenser 120 receives, as an input, humid air 104 from reaction vessel 150. The humid air is passed through heat exchanger 114 in order to output fresh water 111. Condenser 120 is cooled using coolant 106.

Humid air that is extracted from the reaction vessel 150 will direct the humid air 104 into a coil such as heat exchanger 114 that can be chilled in a submersed tank/vessel of coolant 106. Coolant 106 in heat exchanger 114 may be from the same source as input water 102.

Alternatively, feed water 106 can be pumped through the heat exchanger 116 (rather than submersing a pipe in the coolant 106). Then, moist air from the Humid Air Extraction system is sent into this vessel/tank and water vapor condenses along this piping system, and the output water 111 is allowed to collect/drip down to a basin below, where it is collected.

As output water 111 is intended for non-potable water uses (e.g. for agriculture, irrigation, toilets, cooling, chilling systems, etc.); the final water quality does not have to meet drinking water regulations. Output water may be further disinfected and/or filtered if its will be used for drinking water purposes.

In alternate embodiments, multiple reaction vessels 150 may be installed in series or parallel configurations, or may operate using a dome structure sharing a lens 152 where one larger solar lens is employed. The system of reaction vessels 150 and condensers 120 may be duplicated in series and parallel, creating a network with multiple stages of maximum heat and energy recovery. Warm brine 103 (once it reaches a certain temperature and/or salinity or total dissolved solids level) can be extracted from the first stage, and introduced into the second stage, further evaporating more water from the brine solutions. Outputted brine may be processed in a crystallizer or solar pond for further commercial processes (such as solid salt crystal generation or used in the lithium production process.

The yield of output water 111 produced from condenser 120 will depend on numerous factors from the reaction vessel 150: size and type of lens configuration, surface area of thermal conductor, water vapour extraction, air velocity, mass air flowrate, condensation system efficacy, scaling control, surface area of water evaporation, etc. Further, the output may be varied based on the temperature of coolant 106. According to some embodiments, coolant 106 may be replaced by an alternative industrial coolant (rather than feedwater) coolant having its own thermal properties. According to some embodiments, coolant may be hot brine output 103 retrieved from the basin 176.

Figure 5:
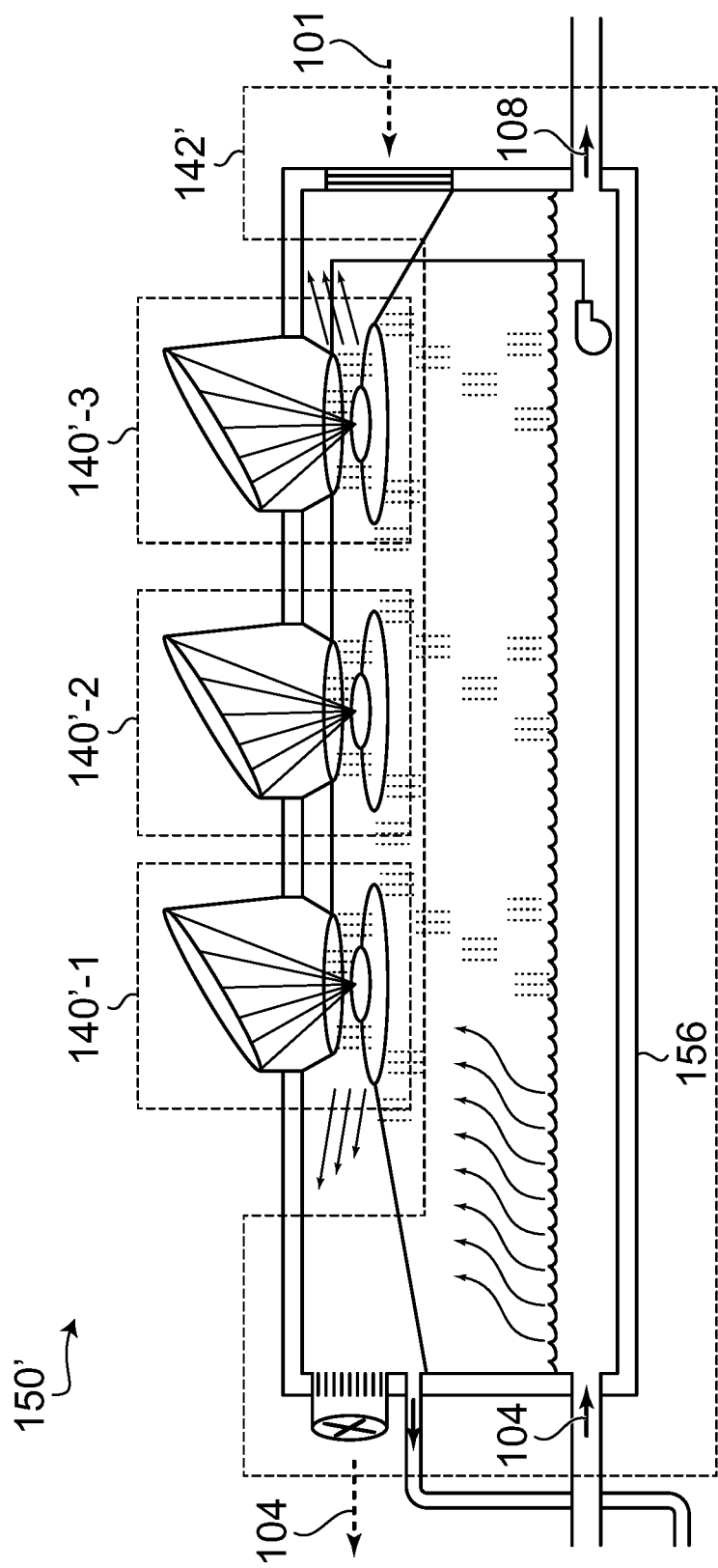
FIG. 5 is a schematic diagram of an alternate reaction vessel.

FIG. 5 illustrates a reaction vessel 150' according to an alternative embodiment. According to this embodiment, a single container vessel 156' having surface humidity components 142' may be used with multiple rapid water vapor components 140', on the top of the reaction vessel 150' or on the sides. In these embodiments, a single basin 176 is still used, however multiple lenses 152, thermal conductors 158, and sprinkler heads 160 are employed. According to some embodiments, a single pump 172 is employed to deliver water from basin 176 to the surface evaporation components 140'-1, 140'-2, and 140'-3. The piping from pump 172 to sprinkler heads 160 will necessarily need to be modified to allow the intersectional connections. According to some embodiments, multiple pumps 172 may be used in parallel. In further embodiments, the reaction vessels can also utilize the sides of the container 156 where similar rapid water vapor components 140 can be installed to utilize the suns radiation from all sides of the reaction vessel.

Figure 6:
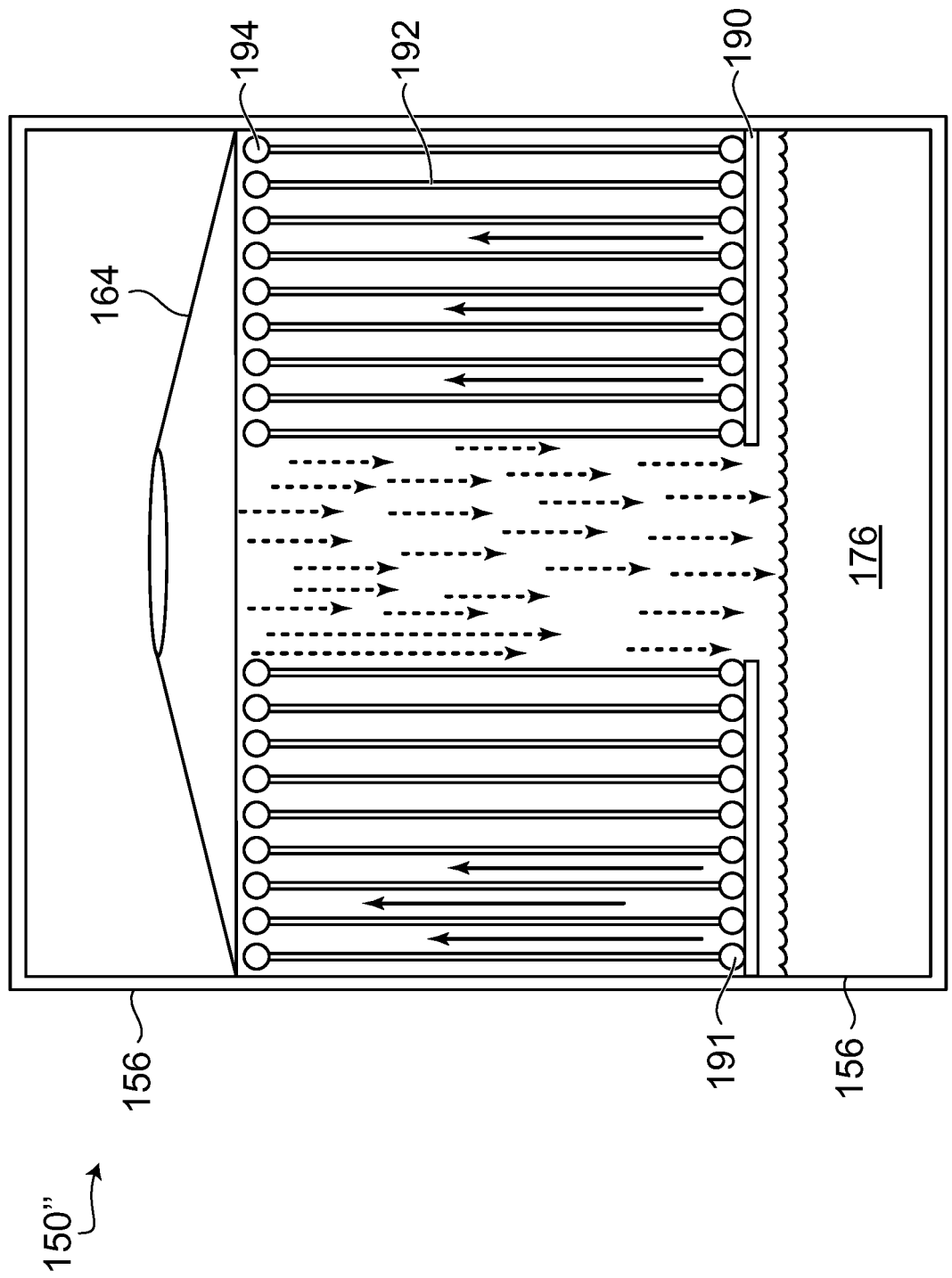
FIG. 6 is a cross-sectional view of a reaction vessel to be used in water desalinator, according to another embodiment.

FIG. 6 illustrates a cross-sectional view of a further reaction vessel 150" to be used in a water desalinator, according to a further embodiment. In this embodiment, sheets 192 may be inserted internally across the container vessel 156. Sheets 192 may be a cotton, mesh, or any other suitable synthetic fabric, coated with a hydrophobic coating. Humid air can collect on the surface of either side of sheets 192. This adds to the available surface area for evaporation, as well as water vapor harvesting. Water vapor will collect and trickle down to be collected through bottom collection troughs 191 supported on platform 190, itself affixed to the walls of container vessel 156. Troughs 191 are placed at the bottom of sheets 192, and form a convex shape (such as a half pipe) to collect drops as they accumulate and form on both sides of the mesh fabric.

Sheets 192 are suspended from fasteners 194 positioned under drainage panel 164. According to some embodiments, fasteners 194 may be horizontally level with each other. When fasteners 194 are horizontally level with each other, fasteners 194 may be a slider mechanism, such that there is a greater ease for insertion and removal of sheets. According to some embodiments, wires, may alternatively or additionally be vertically hung throughout the reaction vessel 150". These wires would function similarly to the sheets 192.

According to other embodiments, fasteners 194 may traverse along the internal underside contour of drainage panel 164. In these embodiments, the sheets 192 may be of variable sizes and have greater surface area for generation of additional humidity and water vapor harvesting.

Electronic components within the water desalinator 100 may be configured to operate using AC or DC power. According to embodiments that require AC, the water desalinator 100 may be optimized for conventional household voltages, such that the system may be operated using a standard residential electrical plug. Alternative AC embodiments may be optimized for the local voltage and frequency. According to other embodiments, DC components using a constant voltage may be used.

Figure 7:
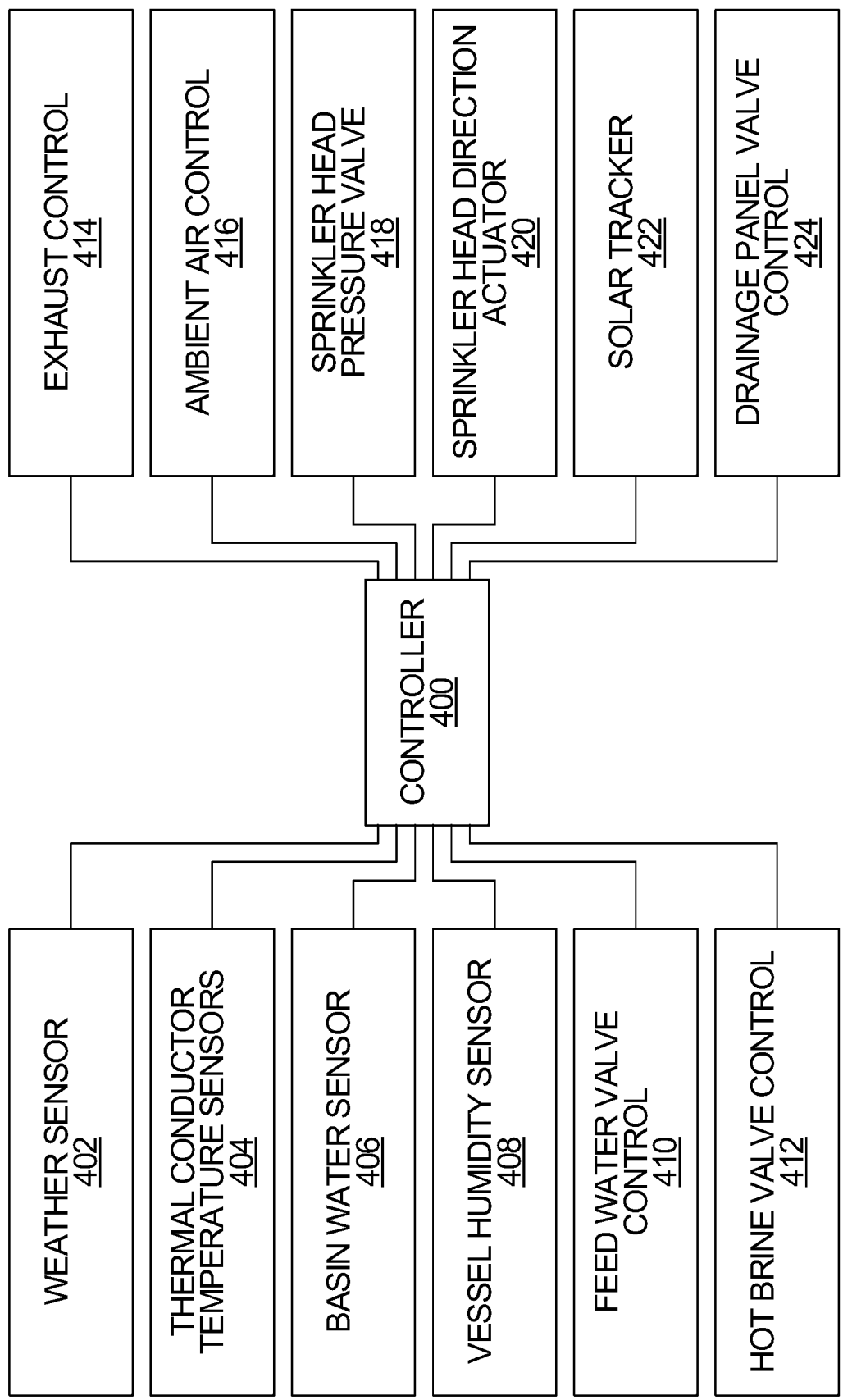
FIG. 7 is a block diagram of electronic inputs and output components used to manage the operation of the water desalinator of FIG. 1.

FIG. 7 is a block diagram of electronic inputs and output components used to manage the operation of water desalinator 100. Sensors, valves and actuators, may be employed and configured to communicate with a controller 400. Controller 400 may be a programmable logic controller (PLC), such as a unit chosen from the Logix 5000 series devices made by Allen-Bradley/Rockwell Automation, such as the ControlLogix 5561 device. Individual functional components of controller 400 may include a processor, memory, and network interface. Memory may store instructions that when executed by processor perform the actions as described. Controller 400 may receive further input through a network interface to a local area or the internet to allow for remote operation and receive external data, such as operational and environmental requirements. Components managed using controller 400 which may operate to perform the functions of the controller as described in regard to previous figures. While illustrated as a single controller 400, the operations may be divided into a plurality of controller units with specified instructions. Controller 400 may include a memory and processor. The processor will execute instructions stored on the memory to perform the operations as defined. Controller 400 is communicably linked to sensor and actuators via a communicative protocol such as RS232, Bluetooth™, WiFi, etc. Sensors and actuators may include, for example, a weather sensor 402, a thermal conductor temperature sensor 404, a basin water sensor 406, a vessel humidity sensor 408, a feed water valve control 410, a hot brine valve control 412, an exhaust control 414, an ambient air control 416, a sprinkler head pressure valve 418, a sprinkler head direction actuator 420, a solar tracker control 422, and a drainage panel valve control 424. The individual function of each control module will be described hereinafter. The operation of the complete system is anticipated to eventually leverage artificial intelligence and machine learning to maximize output yield and performance based on external conditions (weather, solar irradiance, geographical location, elevation, etc.) and internal conditions from the feedback of instrumentation, sensors (temperature, humidity, water quality, salinity, etc.) and IoT.

Weather sensor 402 may include an anemometer, thermometer, rain meter, and a sensor configured to detect the position of the sun in the sky. Using this information, controller 400 will determine the appropriate position to direct lens 152 and communicate with solar tracker 422 to instruct any actuators or motors to position the lens 152 accordingly. The intended operation and function of the tracking lens biomimics that of a young sunflower plant, which tracks the sun throughout the day, always facing directly perpendicular the sun, to maximize exposure.

Thermal conductor sensors 404 operate to evaluate the temperature on thermal conductor 158. These sensors may be embedded into the thermal conductor 158 and communicatively linked to the controller 400, or may be a plurality of wireless sensors (such as infrared temperature sensors) configured to evaluate the temperature at points across the thermal conductor 158. Using this information, controller 400 may instruct the sprinkler head pressure valve 418 and the sprinkler head direction actuator 420 to modify the rate or position at which water is sprayed on thermal conductor 158.

Basin water sensor 406 measures the depth, temperature, and mineral content of water in basin 176. The sensor is communicatively linked to controller 400, which may adjust the water in basin 176 using feed water valve control 410 to allow new input water 102 in, or hot brine valve control 412 to allow hot brine water 103 out.

Vessel humidity sensor 408 monitors and measures the percentage of water vapour in the container vessel 156. Vessel humidity sensor 408 is communicatively linked to controller 400, which may adjust the amount of humid air output 104 through the speed or pitch of exhaust fan 178 via exhaust control 414, or the ambient air 101 allowed in through intake vent 166 via ambient air control 416. Vessel humidity sensor 408 may include a wet bulb temperature sensor.

Drainage panel valve control 424 monitors the amount of condensate that has formed across drainage panels 164. If the condensate formed in drainage panels 164 exceeds a defined amount, the drainage panel valve control 424 will signal to allow condensate through output pipe 180.

The process is considered an off-the-grid system as it does not require any process chemicals, nor does it require high voltage electrical equipment, and it is operated continuously (provided the required solar circumstances) under ambient conditions and atmospheric pressures. The recirculation water pump, air extraction fan, solar tracking system, and instrumentation can all operate at 110-220 VAC and/or solar powered.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A water desalinator comprising:
   a reaction vessel defining a chamber, the reaction vessel comprising:
      a basin, configured to receive salty water to be desalinated, the basin having an open top surface to allow water in the basin to evaporate from the basin into a region in the chamber above the basin and rise to the top of the reaction vessel;
      to;
      drainage panels extending from at least one wall of the reaction vessel to an opening, wherein the drainage panels allow evaporated water in said region in the chamber above the basin to pass and drain any condensation formed above the drainage panels; and
      an extraction vent configured to remove humid air from the reaction vessel;
   a thermal conductor contained within the reaction vessel positioned at a height above the basin;
   a lens in optical communication with an exterior of the reaction vessel, configured to heat the thermal conductor;
   a pump in communication with the basin and the thermal conductor, arranged to pump salty water from the basin to the thermal conductor;
   wherein said thermal conductor heats salty water provided by the pump to produce water vapor in the reaction vessel, and wherein any heated unevaporated salty water return to said basin;
   a condenser external to the chamber, comprising:
      a heat exchanger configured to receive humid air from the output vent, wherein the heat exchanger is cooled with a coolant to condense water vapour in the air to generate desalinated water.

2. The water desalinator of claim 1, wherein the lens is a fresnal lens.

3. The water desalinator of claim 1, further comprising a solar tracker configured to reposition and adjust the lens in dependence on the relative position of the lens to the sun.

4. The water desalinator of claim 1, further comprising an exhaust fan configured to extract humid air from the reaction vessel to the condenser.

5. The water desalinator of claim 1, wherein the pump is configured to feed an output sprinkler head, the sprinkler head having a variable off-center spray position on the thermal conductor.

6. The water desalinator of claim 1, further comprising sheets suspended from an underside surface of the drainage panels, said sheets configured to trap moisture and allow moisture to fall down said sheets.

7. The water desalinator of claim 6, further comprising troughs situated at the bottom of said sheets, said troughs configured to direct condensate to a second output.

8. The water desalinator of claim 1, further comprising sheets suspended from an underside surface of the drainage panels, said sheets configured to trap moisture and allow moisture to fall down said sheets.

9. The water desalinator of claim 8, further comprising troughs situated at the bottom of said wires, said troughs configured to direct condensate to a second output.

10. The water desalinator of claim 1, wherein the thermal conductor has a variable temperature across a radial distance from its centre.

11. The water desalinator of claim 10, wherein the thermal conductor is one of a flat, rounded conical, and pyramidical shape.

12. The water desalinator of claim 10, wherein the thermal conductor is made of at least two materials having different thermal conductivities.

13. The water desalinator of claim 10, wherein the condenser is cooled using the salty water.

14. The water desalinator of claim 1, wherein an electric current is provided to the thermal conductor to prevent scaling.

15. The water desalinator of claim 1, wherein the reaction vessel is an intermodal freight container.

16. The water desalinator of claim 1, wherein the reaction vessel is further configured to be operated at a pressure lower than an external atmospheric pressure.

17. A desalinator comprising:
   an intermodal shipping container, the shipping container comprising:
      a lower portion forming a basin configured to store salty water, the basin having an open top surface to allow water in the basin to evaporate from the basin into a region in the intermodal container above the basin;
      an upper portion;
   a thermal conductor in the upper portion of the intermodal shipping container configured to receive salty water to generate humid air;
   drainage panels within the intermodal shipping container positioned between the lower portion and upper portion,
   a lens to direct light to heat the thermal conductor;
   a pump in communication with the basin and the thermal conductor, arranged to pump salty water from the basin to the thermal conductor;
   a condenser;
      wherein the thermal conductor heats salty water provided by said pump to produce water vapor inside the intermodal shipping container, and wherein heated unevaporated salty water returns to the basin;
      wherein the drainage panels are configured to capture and remove condensate formed in the shipping container;

and wherein the humid air is output from the container to the condenser for collection and production of condensate.

* * * * *